United States Patent
Jeffries

(10) Patent No.: US 10,550,586 B2
(45) Date of Patent: Feb. 4, 2020

(54) CABINET WITH SNAP-IN FRAME

(71) Applicant: Austin Hardware & Supply, Inc., Lee's Summit, MO (US)

(72) Inventor: Mark Steven Jeffries, Buford, GA (US)

(73) Assignee: Austin Hardware and Supply, Inc., Lee's Summit, MO (US)

(*) Notice: Subject to any disclaimer, the term of this patent is extended or adjusted under 35 U.S.C. 154(b) by 0 days.

(21) Appl. No.: 15/699,058

(22) Filed: Sep. 8, 2017

(65) Prior Publication Data
US 2018/0073255 A1 Mar. 15, 2018

Related U.S. Application Data

(60) Provisional application No. 62/393,222, filed on Sep. 12, 2016.

(51) Int. Cl.
| | | |
|---|---|---|
| *E04F 19/08* | (2006.01) | |
| *A47B 53/02* | (2006.01) | |
| *A47B 97/00* | (2006.01) | |
| *A47B 81/00* | (2006.01) | |

(52) U.S. Cl.
CPC ............ *E04F 19/083* (2013.01); *A47B 53/02* (2013.01); *A47B 97/00* (2013.01); *A47B 81/00* (2013.01)

(58) Field of Classification Search
CPC ......... A47B 97/00; A47B 81/00; A47B 53/02; E04F 19/083
See application file for complete search history.

(56) References Cited

U.S. PATENT DOCUMENTS

| | | | | |
|---|---|---|---|---|
| 2,569,763 A | * | 10/1951 | Hofferberth | F25D 23/021 220/592.09 |
| 2,578,096 A | * | 12/1951 | Smith | A47B 67/02 312/227 |
| 2,858,408 A | * | 10/1958 | Barroero | F25D 23/021 219/218 |
| 3,389,943 A | * | 6/1968 | Jones | E06B 3/4663 312/139.2 |
| 3,419,933 A | * | 1/1969 | Gossen | A47B 95/04 16/94 R |
| 3,601,462 A | * | 8/1971 | Fenwick | A47F 3/005 312/139.2 |
| 3,636,661 A | * | 1/1972 | Strawsine | A47B 67/02 312/209 |
| 3,673,735 A | * | 7/1972 | Winsler | A47F 3/043 49/400 |
| 4,004,370 A | * | 1/1977 | Heaney | A47F 3/043 49/504 |
| 4,028,849 A | * | 6/1977 | Anderson | E06B 1/6053 49/181 |

(Continued)

*Primary Examiner* — Hanh V Tran
(74) *Attorney, Agent, or Firm* — Posinelli PC

(57) ABSTRACT

A cabinet with a snap-in frame is described. The cabinet uses spring clips that engage the frame to an opening of the cabinet. The spring clips are fastened to outer edges around the opening of the cabinet. The frame is urged into the opening of the cabinet. The frame compresses the spring clips as the frame is pushed into the opening of the cabinet. End portions of the spring clips snap into recesses of an outer surface of the frame. The spring clips are easily aligned along the opening of the cabinet to ensure proper placement of the frame with respect to cabinet.

21 Claims, 7 Drawing Sheets

(56) References Cited

U.S. PATENT DOCUMENTS

| | | | | |
|---|---|---|---|---|
| 4,148,535 A * | 4/1979 | Fenwick | ............... | A47B 47/04 16/95 R |
| 4,230,381 A * | 10/1980 | Rhoades | ............... | E05D 1/06 16/269 |
| 4,274,688 A * | 6/1981 | Zacky | ............... | A47F 3/005 312/140 |
| 4,488,391 A * | 12/1984 | Pavnica | ............... | E06B 1/02 52/211 |
| 4,597,122 A * | 7/1986 | Handler | ............... | A47C 17/86 217/62 |
| 4,599,836 A * | 7/1986 | Melcher | ............... | E06B 5/003 49/62 |
| 4,648,221 A * | 3/1987 | Haggqvist | ............... | E06B 3/28 52/202 |
| 4,723,820 A * | 2/1988 | Kroneck | ............... | A63H 3/52 312/138.1 |
| 5,069,512 A * | 12/1991 | Sykes | ............... | A47F 3/005 248/205.3 |
| 5,109,647 A * | 5/1992 | La See | ............... | E06B 3/685 52/456 |
| 5,255,473 A * | 10/1993 | Kaspar | ............... | A47F 3/043 49/501 |
| 5,645,330 A * | 7/1997 | Artwohl | ............... | A47F 3/0426 312/116 |
| 5,716,117 A * | 2/1998 | Yu | ............... | G11B 33/0455 206/308.1 |
| 5,853,238 A * | 12/1998 | Cullen | ............... | E06B 3/4663 312/304 |
| 6,155,010 A * | 12/2000 | Becken | ............... | E06B 3/685 24/570 |
| 7,150,126 B2 * | 12/2006 | Rivera | ............... | B60J 5/06 49/62 |
| 7,896,451 B2 * | 3/2011 | Walsh | ............... | A47F 3/0486 312/139.2 |
| 8,006,445 B2 * | 8/2011 | Burton | ............... | E06B 1/58 49/475.1 |
| 8,074,698 B2 * | 12/2011 | Allsopp | ............... | E06B 9/264 160/107 |
| 8,182,052 B2 * | 5/2012 | Bourgain | ............... | E05B 47/026 312/139.2 |
| 9,512,666 B2 * | 12/2016 | Reyher | ............... | E06B 1/36 |
| 10,045,638 B2 * | 8/2018 | Artwohl | ............... | A47F 3/0434 |
| 2005/0204664 A1 * | 9/2005 | Snyder | ............... | E04F 17/04 52/302.1 |
| 2007/0236111 A1 * | 10/2007 | Gray | ............... | A47B 96/02 312/138.1 |
| 2009/0140537 A1 * | 6/2009 | Kittelson | ............... | F25D 23/10 296/24.4 |
| 2009/0282663 A1 * | 11/2009 | Martin | ............... | A47B 83/001 29/281.5 |
| 2010/0242370 A1 * | 9/2010 | Trulaske, Sr. | ......... | E05D 13/14 49/410 |
| 2011/0047875 A1 * | 3/2011 | Kelley | ............... | E06B 3/28 49/63 |
| 2013/0285517 A1 * | 10/2013 | Wach | ............... | A47F 3/043 312/114 |
| 2014/0354130 A1 * | 12/2014 | Lagree | ............... | H02G 3/14 312/293.3 |
| 2018/0008364 A1 * | 1/2018 | Orr | ............... | A61B 50/33 |

* cited by examiner

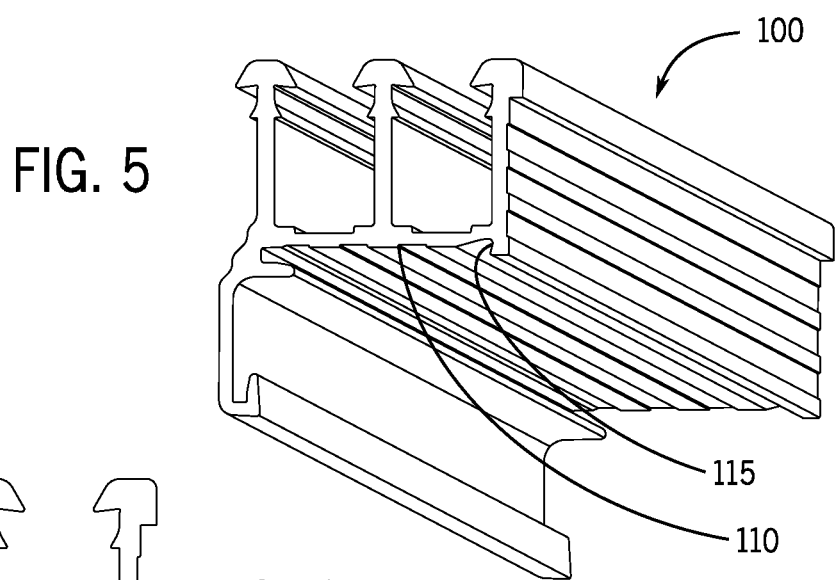
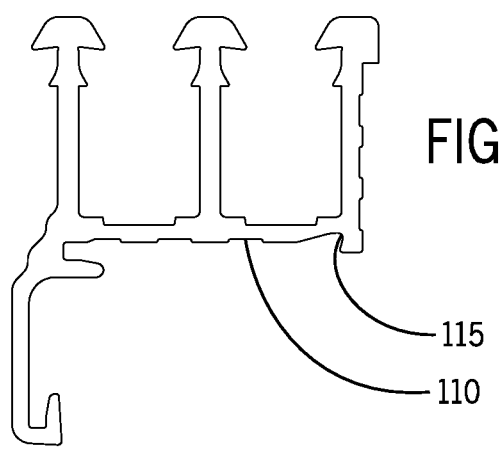
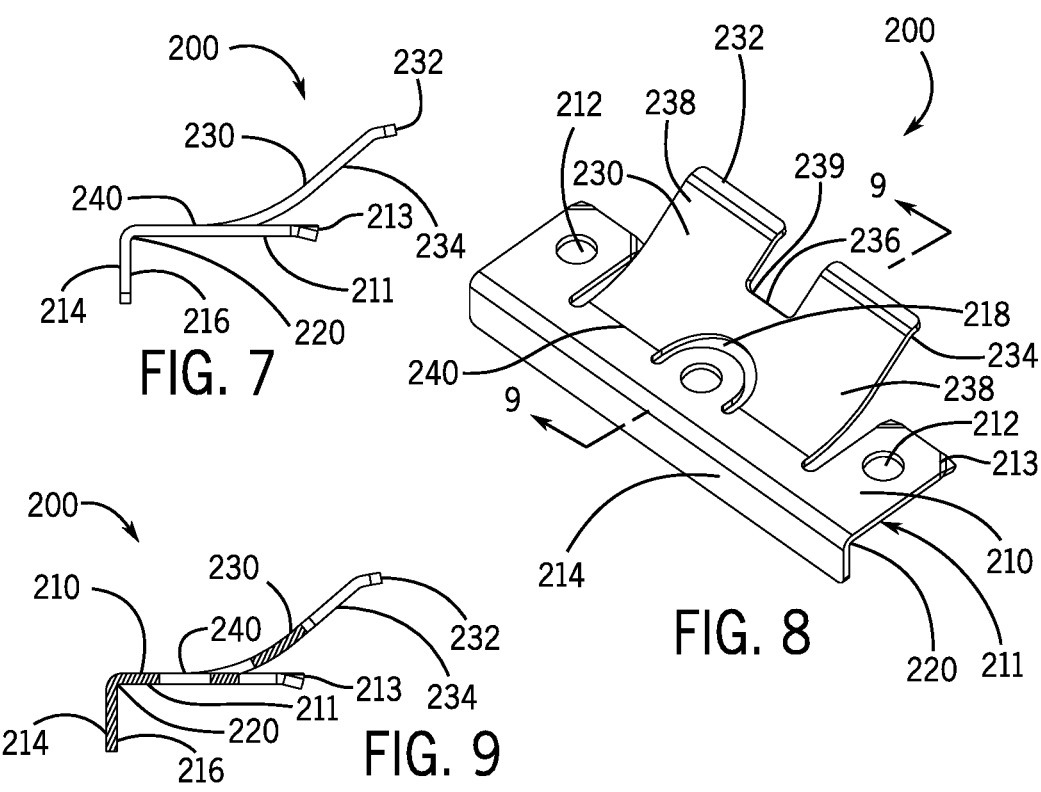

CABINET WITH SNAP-IN FRAME

CROSS REFERENCE TO RELATED APPLICATION

This application claims the benefit of U.S. Provisional Patent Application 62/393,222 filed Sep. 12, 2016, which is hereby incorporated by reference.

FIELD OF INVENTION

The present invention relates to a cabinet with a snap-in frame.

BACKGROUND

Frames typically attach to cabinet with screws and other permanent fasteners. Such construction is time consuming and requires skill in order to achieve proper alignment between the frame and the cabinet. Further, the screws leave permanent holes in the cabinets should the frame require movement or adjustment.

SUMMARY

A cabinet with a snap-in frame is described. The cabinet uses spring clips that engage the frame to an opening of the cabinet. A plurality of the spring clips are fastened to outer edges around the opening of the cabinet. The frame is urged into the opening of the cabinet. The frame compresses the spring clips as the frame is pushed into the opening of the cabinet. End portions of the spring clips snap into recesses of an outer surface of the frame. The spring clips are easily aligned along the opening of the cabinet to ensure proper placement.

The spring clips include a spring structure or spring member that holds the frame to the cabinet. The spring clips bias the frame into position at the opening of the cabinet. The spring clips fit to a front edge of the cabinet—providing an easy way to ensure alignment and placement with respect to a depth of the cabinet.

A springing action of the spring clips provides a built in level of adjustment. The springing action of the spring clips improves tolerances to accommodate variation in the frame and/or cabinets during the installation of the frame to the cabinets.

The frames cover a front of the cabinet and selectively open and close the cabinet. The frames may include sliding panels or other doors to cover the opening of the cabinet. The cabinet and frame described herein are well suited for use on emergency vehicles, such as ambulance, fire trucks, etc. The cabinets and frame may be used for storage on such vehicles. The frames with sliding panels may be used close the cabinets and prevent the contents of the cabinet from falling out of the cabinet. The sliding closures may include Plexiglas panels, which slide back and forth in the frame to open and close the cabinet.

The spring clips reduce installation time. The spring clips may be pre-installed at the cabinet manufacturer's facility. The spring clips fit to the front edge of the cabinet. The spring clips are automatically installed at the correct depth in the cabinet—and provide a range of proper installation points with respect to the width of the cabinet. After installation, the frame is removable from the cabinet by pressing on the spring portion and disengaging the spring portion from the frame. The spring clips may engage with frame in a non-destructive and removable manner.

In one aspect, a cabinet and frame assembly is described. The cabinet and frame assembly includes a cabinet having an upper wall opposite of a lower wall and a left side wall opposite of a right side wall. The upper wall, the lower wall, the left side wall and the right side wall define an opening for the cabinet. The upper wall forms an upper edge, the lower wall forms a lower edge, the left side wall forms a left edge, and the right side wall forms a right edge. One or more spring clips are fastened over at least one of the upper edge, the lower edge, the left edge, or the right edge. A frame includes an upper section opposite of a lower section and a left section opposite of a right section. The one or more spring clips engage to outer surfaces of the frame to hold the frame to the cabinet.

In another aspect, a cabinet assembly is described. The cabinet includes an upper wall opposite of a lower wall and a left side wall opposite of a right side wall. The upper wall, the lower wall, the left side wall and the right side wall define an opening for the cabinet. The upper wall forms an upper edge, the lower wall forms a lower edge, the left side wall forms a left edge, and the right side wall forms a right edge. One or more spring clips are fastened over at least one of the upper edge, the lower edge, the left edge, or the right edge, and wherein the spring clips includes a mounting portion, a spring portion that extends upward from the mounting portion, and a supporting portion that extends downward from the mounting portion.

In another aspect, a spring clip for engaging a frame to a cabinet is described. The spring clip includes a mounting portion. The spring clip includes a spring portion that extends upward from the mounting portion. The spring portion is configured to move or flex relative to the mounting portion. The spring portion leads to an end that engages with a frame. A supporting portion extends downward from the mounting portion.

In another aspect, a method of installing a frame to a cabinet is described. The method includes providing a cabinet that includes an upper wall opposite of a lower wall and a left side wall opposite of a right side wall, and the upper wall, the lower wall, the left side wall and the right side wall defining an opening for the cabinet. The method further includes installing one or more spring clips along at least one of an edge of the upper wall, the lower wall, the left side wall or the right side wall. The method further includes inserting a frame member through the opening of the cabinet. The method further includes contacting the spring clips with an outer surface of the frame. The method further includes biasing the spring clips with the outer surface of the frame. The method further includes engaging the spring clips to the outer surface of the frame.

BRIEF DESCRIPTION OF DRAWINGS

FIG. 3 is a close-up view of the spring clip attached to the cabinet.

FIG. 5 is a perspective view of the frame section.
FIG. 6 is an end view of the frame section.
FIG. 7 is a side view of the spring clip.
FIG. 8 is a perspective view of the spring clip.
FIG. 9 is a sectional view of the spring clip.

DETAILED DESCRIPTION OF INVENTION

Figure 1:
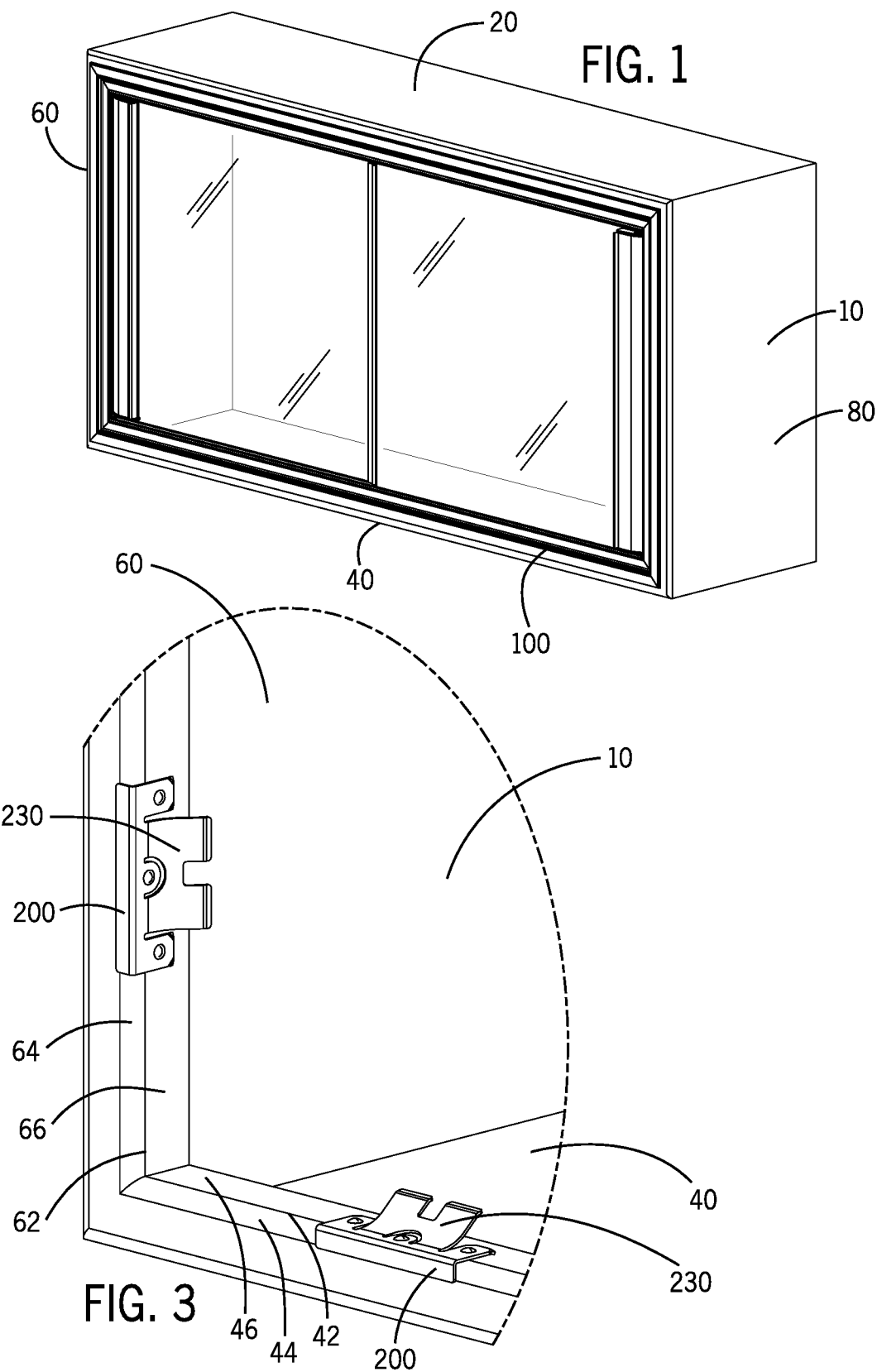
FIG. 1 is a perspective view of the frame engaged to the cabinet.
Figure 2:
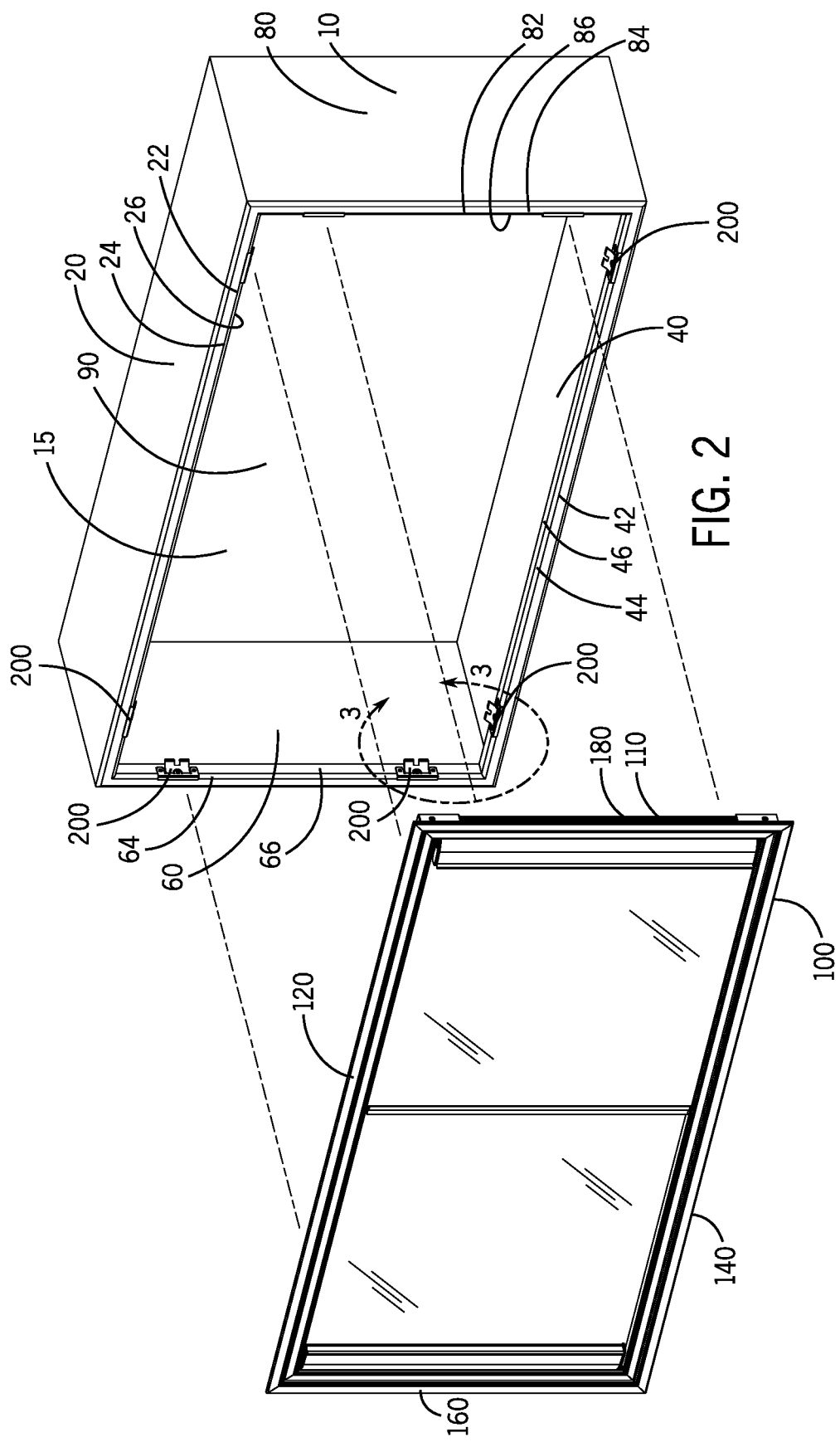
FIG. 2 is a perspective view showing the installation of the frame to the cabinet.

With reference to FIGS. 1-3, a cabinet 10 and a frame 100 are illustrated. The frame 100 engages to the cabinet 10 using spring clips 200. The frame 100 may be inserted into an opening 15 of the cabinet 10 and snap-fit into a correct mounting position by merely pushing the frame 100 toward a rear of the cabinet 10.

Figure 4A:
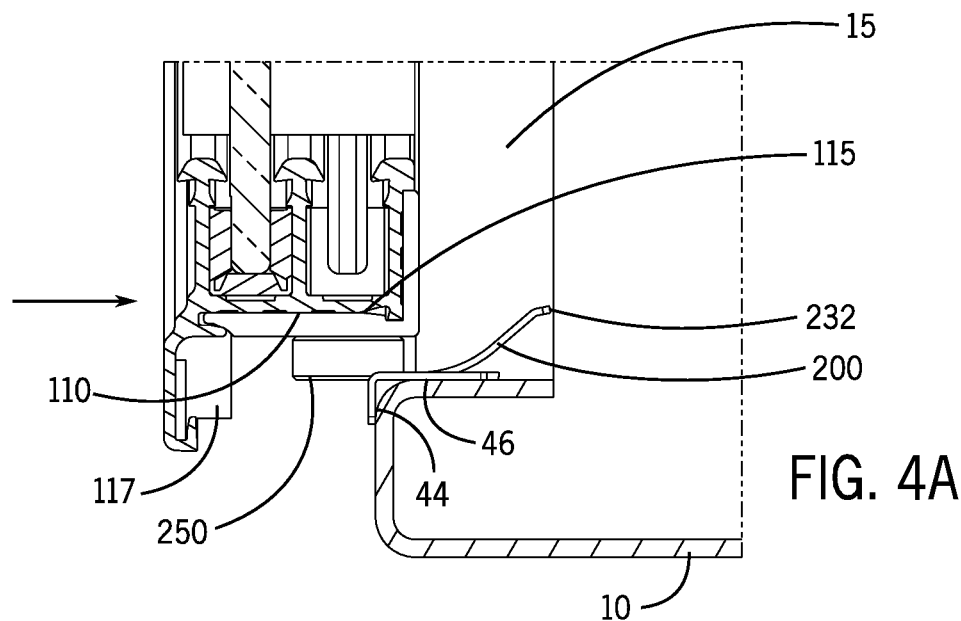
FIG. 4A is a sectional view showing installation of the frame to the cabinet.
Figure 4B:
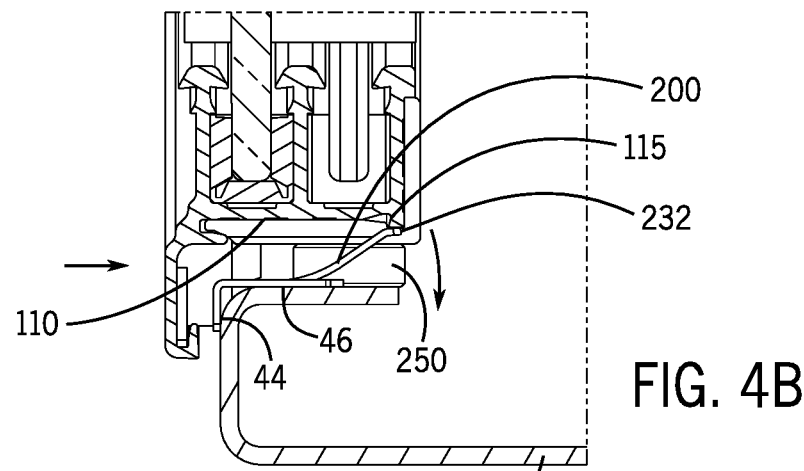
FIG. 4B is a sectional view showing installation of the frame to the cabinet showing the biasing of the spring portion downward.
Figure 4C:
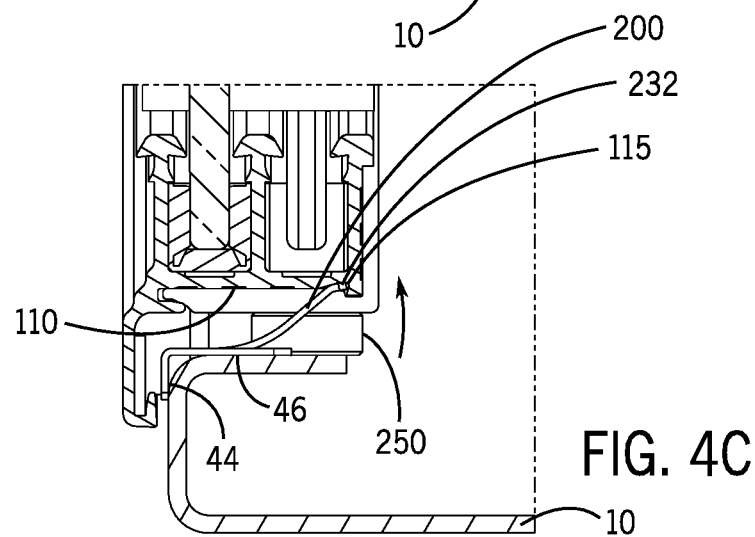
FIG. 4C is a sectional view showing installation of the frame to the cabinet with the spring portion biasing upward to engage the frame.
Figure 10:
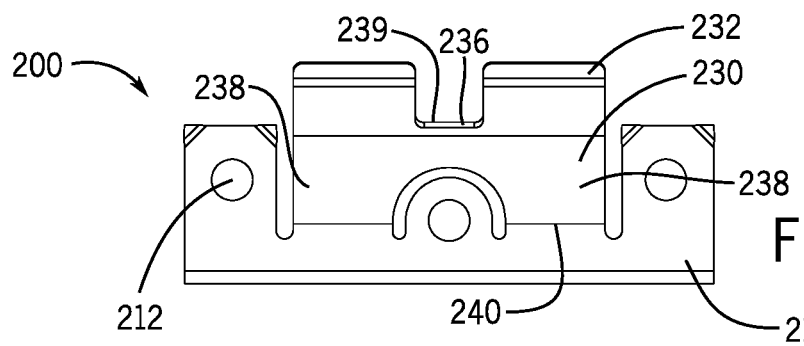
FIG. 10 is a top view of the spring clip.
Figure 11:
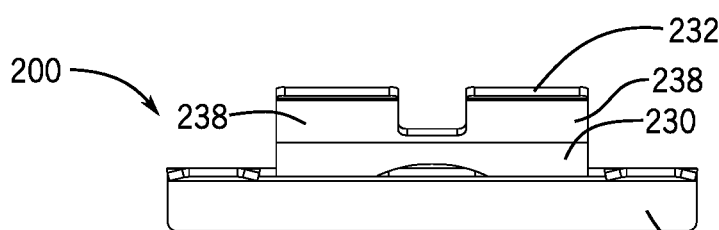
FIG. 11 is a rear view of the spring clip.
Figure 12:
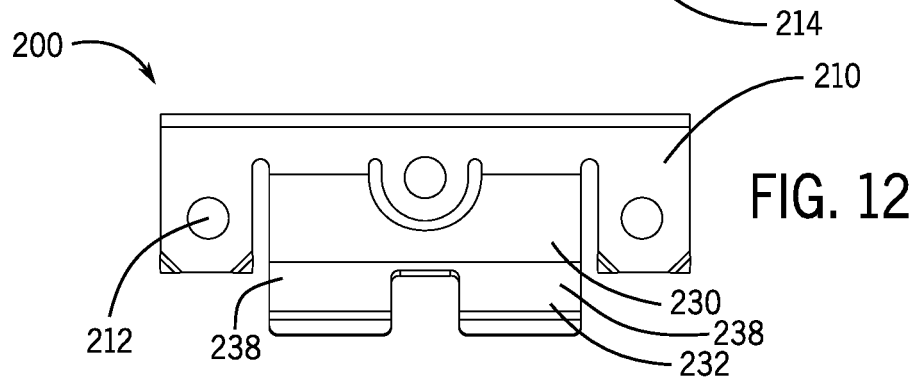
FIG. 12 is a bottom view of the spring clip.
Figure 13:
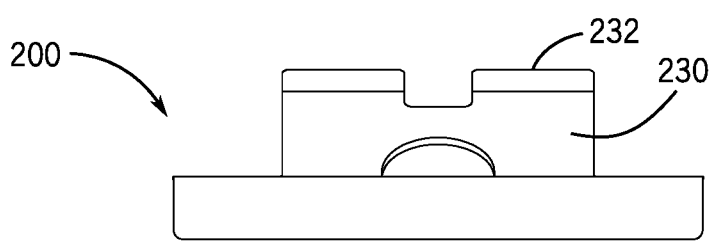
FIG. 13 is a front view of the spring clip.
Figure 14:
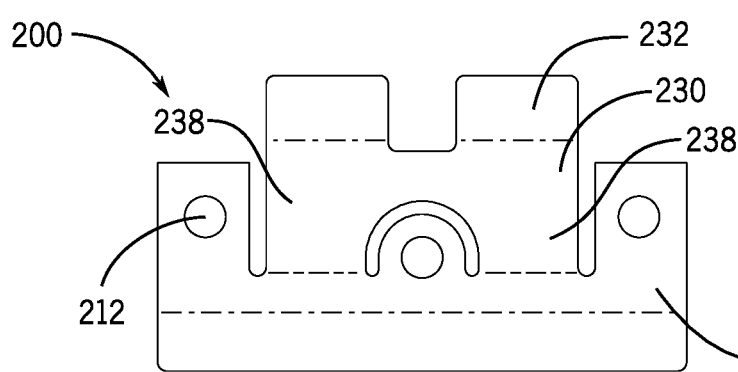
FIG. 14 is a flat pattern of the spring clip.
Figure 15:
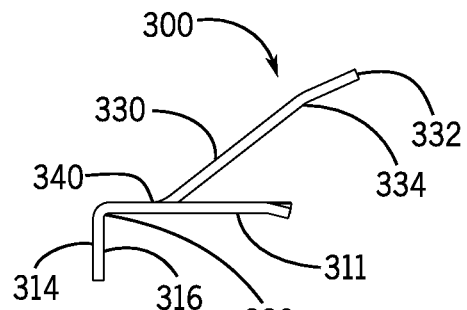
FIG. 15 is a side view of the second spring clip.
Figure 16:
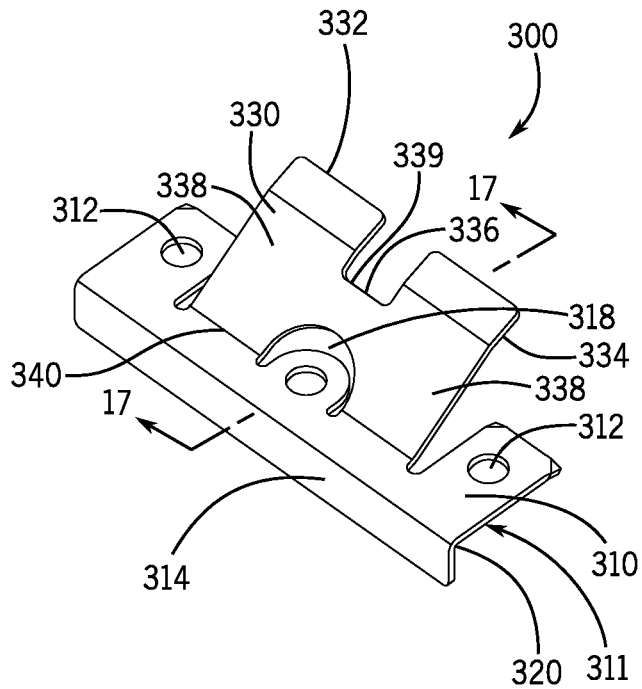
FIG. 16 is a perspective view of the second spring clip.
Figure 17:
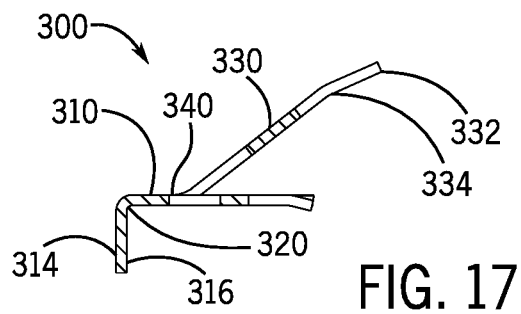
FIG. 17 is a sectional view of the second spring clip.
Figure 18:
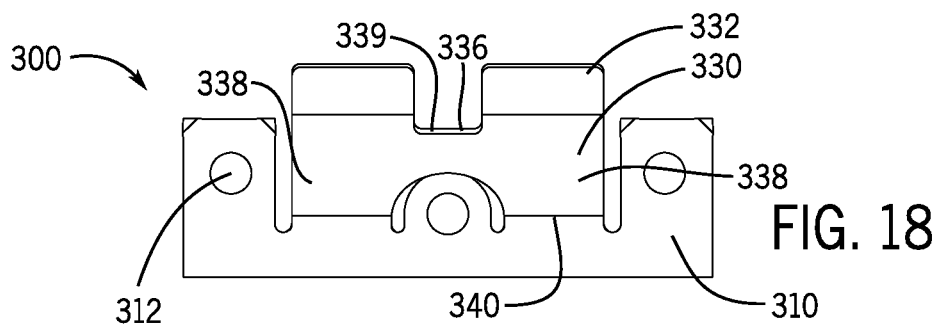
FIG. 18 is a top view of the second spring clip.
Figure 19:
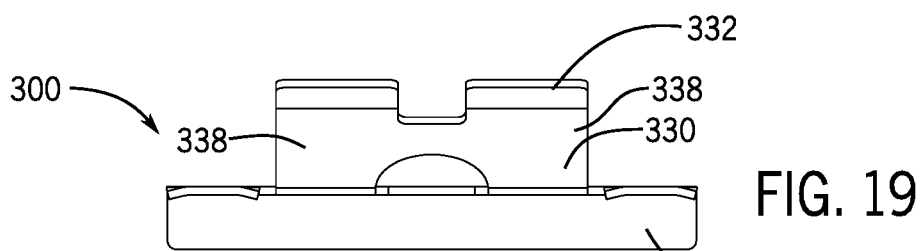
FIG. 19 is a rear view of the second spring clip.
Figure 20:
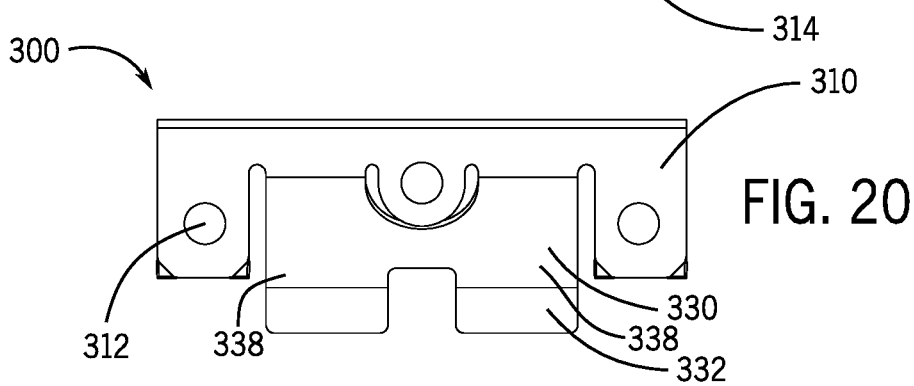
FIG. 20 is a bottom view of the second spring clip.
Figure 21:
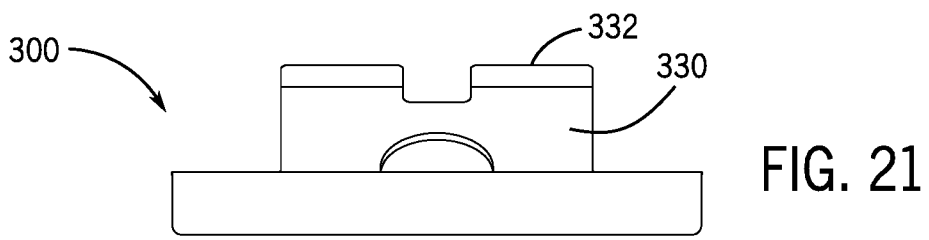
FIG. 21 is a front view of the second spring clip.
Figure 22:
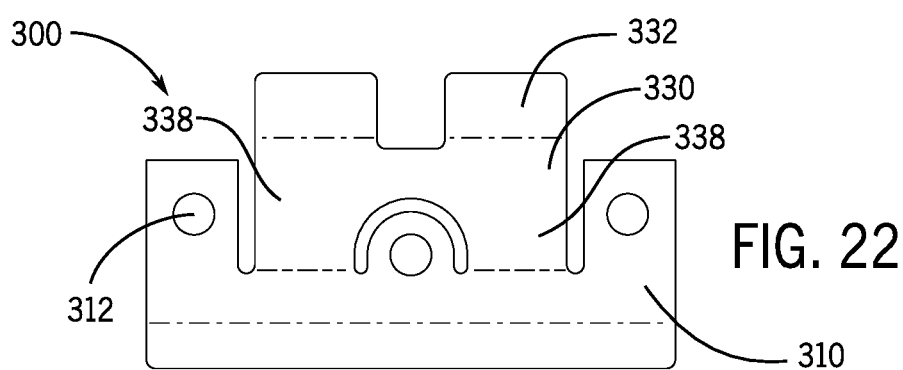
FIG. 22 is a flat pattern of the second spring clip.

The frame 100 includes an upper section 120 opposite of a lower section 140 and a left section 160 opposite of a right section 180. The frame 100 includes an outer surface 110 that engages with the spring clips 200. As shown in FIGS. 4A-4C, the outer surface 110 of the frame 100 includes a recess 115 that receives an end 232 of a spring portion 230 of the spring clip 200. The end 232 snap-fits into the recess 115 to securely hold the frame 100 to the cabinet 10. The recess 115 is further illustrated in FIGS. 5 and 6. The recess 115 may extend much of or all of the length of the frame 100.

With reference to FIG. 2, the cabinet 10 is shown. The cabinet 10 may be formed to have a generally rectangular or square shape. The cabinet 10 includes an upper wall 20 opposite of a lower wall 40 and a left side wall 60 opposite of a right side wall 80. The walls 20, 40, 60, and 80 generally define the opening 15 for the cabinet 10.

The upper wall 20 includes an upper edge 22 formed by a front surface 24 and a lower surface 26. The lower wall 40 includes a lower edge 42 formed by a front surface 44 and an upper surface 46. The left side wall 60 includes a left edge 62 formed by a front surface 64 and an inner surface 66. The right side wall 80 includes a right edge 82 formed by a front surface 84 and inner surface 86. The walls 20, 40, 60, and 80 may be fastened together with or without a rear wall 90. One or more spring clips 200 are fastened over at least one of the upper edge 22, the lower edge 42, the left edge 62, or the right edge 82. In practice, multiple spring clips 200 may be fastened along each edge 22, 42, 62, and 82 to hold the frame 100 to the cabinet 10, although only one or two spring clips 200 may be sufficient to hold the frame 100 to the cabinet 10. The number of spring clips 200 employed will depend on the size of the cabinet 10 and other operating requirements. The exact same style of spring clip 200 may be used on all of the edges 22, 42, 62, and 82 to hold the frame 100 to the cabinet 10.

With reference to FIGS. 7-14, the spring clip 200 is shown. The spring clip 200 includes the spring portion 230 extending upward from a mounting portion 210. The spring portion 230 biases, flexes, and/or moves relative to the mounting portion 210. When the frame 100 is installed to the cabinet 10, the outer surface 110 of the frame 100 compresses the spring portions 230 toward one of the surfaces 26, 46, 66, or 86 of the cabinet 10.

During the installation of the spring portions 230 to the cabinet 10, an inner corner 220 between the spring portion 230 and the mounting portion 210 receives one of the edges 22, 42, 62, or 82 of the cabinet 10. The inner corner 220 may extend an entire width of the mounting portion 210. The generally perpendicular shape of the inner corner 220 fits over the generally perpendicular edges 22, 42, 62, or 82. The positioning of the inner corner 220 flush against the edges 22, 42, 62, or 82 ensures a generally accurate installation depth for the spring clips 200. The lateral position of the snap clip 200 on the edges 22, 42, 62, or 82 may vary—as the snap clip 200 may engage to any of a range of locations on the frame 100. A bottom surface 211 of the mounting portion 210 rests flush on one of the surfaces 26, 46, 66, or 86 of the cabinet 10. A rear 216 of a support portion 214 of the mounting portion 210 abuts flush against one of the front surfaces 24, 44, 64, or 84 of the cabinet 10.

The spring portion 230 extends upwards from the mounting portion 210. The spring portion 230 may extend upward from the mounting portion 210 at an angle of approximately 30 degrees to approximately 75 degrees. In the aspect shown, the spring portion 230 is at resting angle of approximately 60 degrees relative to the mounting portion 210. The spring portion 230 biases upward to engage the frame 100. The spring portion 230 biases relative to the mounting portion 210, which is fixed to the cabinet 10.

The spring portion 230 leads to the end 232. The spring portion 230 may include an angled section 234 to further increase the biasing force of the spring clip 200. The end 232 is at a distal portion of the angled section 234. The angled section 234 may angle downward at approximately 5 degrees to approximately 45 degrees relative to the spring portion 230. In the aspect shown in FIG. 7, the angled section 234 angles downward at approximately 30 degrees. The downward angle of the angled section 234 encourages the spring portion 230 and/or the angled section 234 to bend downward when the spring clip 200 engages the outer surface 110 of the frame 100. If the spring portion 230 and/or the angled section 234 bend upward, then the spring clip 200 may fail.

Once installed, the spring portion 230 and its angled section 234 are pointing toward or angling toward the rear wall 90 or rear of the cabinet 10. This provides for the frame 100 to slide over the mounting portion 210 and ramp over and compress the spring portion 230.

The spring clip 200 may include two tabs 238 leading to the end 232. An opening 236 may be positioned between the two tabs 238. The two tabs 238 angle upward from the mounting portion 210. The opening 236 provides a contact point for depressing the spring portion 230 in order to disengage the spring clip 200 from the frame 100 should the frame 100 need to be removed from the cabinet 10. If the user desires to remove the frame 100 from the cabinet 10, the user inserts a tool into the opening 236 and presses downward to compress the spring portion 230 and disengage it from the frame 100 such that the frame 100 may be removed from the cabinet. As described herein, the spring clips 200 provide a non-permanent and removable fixation between the frame 100 and the cabinet 10. Permanent fasteners, such as screws or bolts, between the frame 100 and the cabinet 10 are not required.

In the aspects shown in FIGS. 1-14, the spring portion 230 divides into the two tabs 238. The two tabs 238 may have some independent movement relative to each other, which may assist in engaging and/or locking to the frame 100. In the aspects of FIGS. 1-14, the two tabs 238 separate from each other at an approximate midpoint of the length of the spring portion 230. The opening 236 may be formed as a generally rectangular cut-out positioned between the two tabs 238. The angled section 234 of each tab 238 begins angling after the formation of the two tabs 238, i.e., the angled sections 234 are between a beginning edge 239 of the opening 236 and the ends 232.

In the aspect of FIGS. 1-14, the spring portion 230 divides into two tabs 238. In other aspects, the spring portion 230 may divide into three or more tabs 238. In other aspects, the spring portion 230 may not have separate tabs, and, for example, a tool opening may be formed in the spring portion 230 to receive the tool for compressing the spring portion 230.

The spring portion 230 extends or angles upward from the mounting portion 210 at the transition 240. In the aspect shown in FIGS. 1-14, the transition 240 is a gradual or rounded corner. This type of transition allows for more distribution of stress. This type of transition provides for the spring portion 230 to bend without breaking. For example, the transition 240 may have a radius of approximately 0.25 to approximately 0.50. In the aspect shown in FIGS. 1-14, the transition 240 has a radius of approximately 0.38.

The spring clip 200 may be formed from a spring steel or other metal alloys. The spring clip 200 may also be molded from plastic materials with sufficient durability and biasing strength.

The mounting portion 210 may include one or more mounting holes 212 to fasten the spring clip 200 to the cabinet 10 with fasteners, such as, screws, nails, etc. As shown FIGS. 1-14, the mounting holes 212 are positioned on opposite sides of the spring portion 230. The spring portion 230 may angle upwards between the mounting holes 212. In other aspects, the spring clip 200 may be glued or otherwise attached to the cabinet 10. In other aspects, the spring clip 200 may be an integral portion of the cabinet 10. For example, the spring clips 200 may be cut or integrally formed from the walls of the cabinet 10.

The support portion 214 of the spring clip 200 extends downward from the mounting portion 210. The rear 216 of the support portion 214 abuts flush against one of the front surfaces 24, 44, 64, or 84 of the cabinet 10. The support portion 214 may extend downward from the mounting portion 210 forming a generally perpendicular angle with respect to the mounting portion 210. The spring clip 200 may include an optional cut-out 218 between a transition 240 from the mounting portion 210 to the spring portion 230. The optional cut-out 218 helps the mounting portion 210 to stay flat against the front surfaces 24, 44, 64, or 84 of the cabinet 10. The optional cut-out 218 also makes the spring portion 230 easier to bend or compress. The optional cut-out 218 may include a semicircular shape formed in a lower portion of the spring portion 230.

With reference to FIG. 7, the spring portion 230 is generally longer than a width of the mounting portion 230. With reference to FIG. 7, the distance from the front corner 220 of the spring clip 200 to the ends 232 of the spring portion 230 is greater than the distance from the front corner 220 to a rear edge 213 of the mounting portion 210. The rear edge 213 may include angled or turned-down corners to dig into the surface of the cabinet 10 when the fasteners are tightened. The angled or turned-down corners add some extra retention between the spring clip 200 and the cabinet 10.

The frame 100 may be formed using extruded metal alloys. For example, aluminum may be melted and forced through a die resulting in lengths of material having an end view as shown in FIG. 6. The spring clips 200 may be used with frame members 100 formed from other materials and formed using other construction methods.

The recess 115 of the frame 100 may include a groove, depression, indent, etc. that engages with the end 232 of the spring clip 200. In the aspect shown, the recess 115 is an integral recess formed into the outer surface 110 of the extruded frame 100.

With reference to FIGS. 4A-4C, the installation of the frame 100 to the cabinet 10 is illustrated. A plurality of the spring clips 200 are installed along the edges 22, 42, 62, and 82 of the cabinet 10. At least one clip 200 is installed along each of the edges 22, 42, 62, and 82, although typically, multiple spring clips 200 are installed along each of the edges 22, 42, 62, and 82. The spring clips 200 are installed with the end 232 of the spring clip 200 pointing, in an angled direction, toward the rear wall 90 or rear of the cabinet 10. In FIG. 4A, the frame 100 is aligned with the cabinet 10, but the frame 100 is not yet contacting the spring clips 200. In FIG. 4B, the frame 100 is compressing the spring clips 200 as the frame 100 is being installed over the spring clips 200. In FIG. 4C, the frame 100 is pushed in far enough to allow the end 232 of the spring clip 200 to snap or spring into the recess 115 of the outer surface 110 of the frame 100. The end 232 of the spring clip biases into the recess 115 of the frame 100 to hold the frame 100 to the cabinet 10.

A gasket 17 on the frame 100 also pushes against the cabinet 10, while the end 232 of the spring clip biases against the recess 115 of the frame 100. These opposing forces lock the frame 100 solidly into position with the cabinet 10. The gasket 17 helps to prevent any movement of the frame 100 after it has been installed to the cabinet 10. Supports 250 may also be positioned along the outer surface 110 of the frame 100. In other aspects, different biasing structures may be used instead of or in addition to the gasket 17. For example, a foam material under the frame 100 or its flange in certain areas may provide the bias between the frame 100 and the cabinet 10.

As described above, the ends 232 of the spring clip 200 bias into the recess 115 of the frame 100 to hold the frame 100 to the cabinet 10. This springing action of the spring portion 230 of the spring clips 230 provides a built in level of adjustment to ease the installation process. The springing action of the spring clips 230 improves tolerances to accommodate variation in the frame 100 and/or cabinet 10 during the installation of the frame 100 to the cabinets 10. The spring clips 230 will hold the frame 100 to the cabinet 10 whether the spring clips 230 are slightly biased, partially biased, mostly biased or fully biased. This operational range accommodates variations and fluctuations between specific frames 100 and/or cabinets 10.

The frame 100 may be easily removed from the cabinet 10. The opening 236 of the spring clip 200 provides a contact point for depressing the spring portion 230 to remove it from the recess 115 in order to disengage the spring clip 200 from the frame 100. Once all the spring clips 200 are disengaged, the frame 100 may be removed from the cabinet 10.

With reference to FIGS. 15-22, a second spring clip 300 is illustrated. The spring clip 300 includes a spring portion 330 extending upward from a mounting portion 310. Similar to the aspects of FIGS. 1-14, the spring portion 330 biases, flexes, and/or moves relative to the mounting portion 210. An inner corner 320 between the spring portion 330 and the mounting portion 310 receives one of the edges 22, 42, 62, or 82 of the cabinet 10. The inner corner 320 may extend an entire width of the mounting portion 310. A bottom surface 311 of the mounting portion 310 rests on one of the surfaces 26, 46, 66, or 86 of the cabinet 10.

The spring portion 330 extends upwards from the mounting portion 310. The spring portion 330 may extend upward from the mounting portion 310 at a transition 340 at an angle of approximately 30 degrees to approximately 50 degrees. In the aspect shown, the spring portion 330 is at resting angle of approximately 38 degrees relative to the mounting portion 310. The spring portion 330 biases upward to engage the frame 100. The spring portion 330 biases relative to the mounting portion 310, which is fixed to the cabinet 10.

The spring portion 330 leads to the end 332. The spring portion 330 may include an angled section 334 to further increase the biasing force of the spring clip 300. The end 332 is at a distal portion of the angled section 334. The angled section 334 may angle downward at approximately 5 degrees to approximately 45 degrees relative to the spring portion 330. In the aspect shown in FIG. 7, the angled section 334 angles downward at approximately 30 degrees. The downward angle of the angled section 334 encourages the spring portion 330 and/or the angled section 334 to bend downward when the spring clip 300 engages the outer surface 110 of the frame 100. If the spring portion 330 and/or the angled section 334 bend upward, then the spring clip 300 may fail.

The spring clip 300 includes two tabs 338 leading to the end 332. An opening 336 may be positioned between the two tabs 338. The two tabs 338 angle upward from the mounting portion 310. The opening 336 provides a contact point for depressing the spring portion 330 in order to disengage the spring clip 300 from the frame 100 should the frame 100 need to be removed from the cabinet 10. If the user desires to remove the frame 100 from the cabinet 10, the user inserts a tool into the opening 336 and presses downward to compress the spring portion 330 and disengage it from the frame 100 such that the frame 100 may be removed from the cabinet. A flat head (or slotted) screwdriver may be used to engage the spring clip 300 to remove it from its locked position.

In the aspects shown in FIGS. 15-22, the spring portion 330 divides into the two tabs 338. The two tabs 338 may have some independent movement relative to each other, which may assist in engaging and/or locking to the frame 100. In the aspects of FIGS. 15-22, the two tabs 338 separate from each other at an approximate midpoint of the length of the spring portion 330. The opening 336 may be formed as a generally rectangular cut-out positioned between the two tabs 338. The angled section 334 of each tab 338 begins angling after the formation of the two tabs 338, i.e., the angled sections 334 are between a beginning edge 339 of the opening 336 and the ends 332.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A cabinet and frame assembly, comprising:
   a cabinet comprising an upper wall opposite of a lower wall and a left side wall opposite of a right side wall; the upper wall, the lower wall, the left side wall and the right side wall defining an opening for the cabinet;
   the upper wall forming an upper edge, the lower wall forming a lower edge, the left side wall forming a left edge, and the right side wall forming a right edge;
   one or more spring clips fastened over at least one of the upper edge, the lower edge, the left edge, or the right edge;
   a frame comprising an upper section opposite of a lower section and a left section opposite of a right section;
   the one or more spring clips configured to engage to outer surfaces of the frame to secure the frame to the cabinet; and,
   the one or more spring clips configured to disengage from the outer surfaces of the frame to remove the frame from the cabinet.

2. The cabinet and frame assembly according to claim 1, wherein the one or more spring clips comprise a mounting portion and a spring portion that extends upward from the mounting portion, and the spring portion comprises two tab portions leading to ends.

3. The cabinet and frame assembly according to claim 2, wherein the ends of the spring portion engage to the outer surfaces of the frame, wherein an opening is formed between the two tab portions.

4. The cabinet and frame assembly according to claim 2, wherein the upper section, the lower section, the left section, and the right section are formed by extrusion, wherein integral recesses are formed in the upper section, the lower section, the left section, and the right section by extrusion, and wherein the ends of the spring portion bias into the integral recesses in the outer surfaces of the frame.

5. The cabinet and frame assembly according to claim 1, wherein the upper edge is formed by a front surface and a lower surface of the upper wall, the lower edge is formed by a front surface and an upper surface of the lower wall, the left edge is formed by a front surface and an inner surface of the left wall, and right edge is formed by a front surface and an inner surface of the right wall, wherein a first spring clip mounts to the upper edge, a second spring clip mounts to the lower edge, wherein a third spring clip mounts to the left edge, and a fourth spring clip mounts to the right edge.

6. The cabinet and frame assembly according to claim 1, wherein the one or more spring clips includes a mounting portion, a spring portion that extends upward from the mounting portion, and a supporting portion extends downward from the mounting portion, wherein the supporting portion forms a generally perpendicular angle to the mounting portion.

7. The cabinet and frame assembly according to claim 6, wherein the generally perpendicular angle of the spring clip fits over the upper edge, the lower edge, the left edge, and the right edge.

8. The cabinet and frame assembly according to claim 7, wherein the mounting portion includes mounting holes, and fasteners pass through the mounting holes and into the lower surface of the upper wall, the upper surface of the lower wall, the inner surface of the left wall, or the inner surface of the right wall.

9. The cabinet and frame assembly according to claim 1, wherein the frame comprises sliding doors, a hinging door, or a combination hinging door with sliding doors.

10. The cabinet and frame assembly according to claim 1, wherein the cabinet and frame assembly is configured to be installed on a vehicle.

11. The cabinet and frame assembly according to claim 3, wherein the opening is configured to receive a tool that biases the spring portion to disengage the one or more spring clips from the outer surfaces of the frame to remove the frame from the cabinet.

12. A cabinet assembly, comprising:
- a cabinet comprising an upper wall opposite of a lower wall and a left side wall opposite of a right side wall, the upper wall, the lower wall, the left side wall and the right side wall defining an opening for the cabinet;
- the upper wall forming an upper edge, the lower wall forming a lower edge, the left side wall forming a left edge, and the right side wall forming a right edge; and,
- one or more spring clips are fastened over at least one of the upper edge, the lower edge, the left edge, or the right edge, and wherein the one or more spring clips includes a mounting portion, a spring portion that extends upward from the mounting portion, the spring portion comprises tab portions leading to ends, an opening is in between the tab portions, and a supporting portion that extends downward from the mounting portion.

13. A spring clip for engaging a frame to a cabinet, comprising:
- a mounting portion;
- a spring portion that extends upward from the mounting portion; the spring portion configured to move or flex relative to the mounting portion; the spring portion includes two tabs leading to ends with an opening positioned between the two tabs; and,
- a supporting portion extends downward from the mounting portion.

14. The spring clip according to claim 13, wherein the two tabs of the spring portion include an angled section.

15. The spring clip according to claim 13, wherein the spring portion extends upward from the mounting portion at an angle of approximately 30 degrees to approximately 75 degrees.

16. The spring clip according to claim 13, wherein the mounting portion includes one or more mounting holes to fasten the spring clip to a cabinet.

17. The spring clip according to claim 13, wherein the supporting portion extends downward from the mounting portion forming a generally perpendicular angle to the mounting portion.

18. The spring clip according to claim 13, wherein the two tabs have independent movement relative to each other.

19. A method of installing a frame to a cabinet, comprising:
- providing a cabinet comprising an upper wall opposite of a lower wall and a left side wall opposite of a right side wall, the upper wall, the lower wall, the left side wall and the right side wall defining an opening for the cabinet;
- installing one or more spring clips along at least one of an edge of the upper wall, the lower wall, the left side wall or the right side wall, the one or more spring clips comprising a mounting portion and a spring portion that extends upward from the mounting portion, and the spring portion comprises tab portions leading to ends;
- inserting a frame through the opening of the cabinet;
- contacting the spring clips with an outer surface of the frame;
- biasing the spring clips with the outer surface of the frame; and,
- engaging the ends of the one or more spring clips to recesses in the outer surface of the frame to secure the frame to the cabinet.

20. The method of installing a frame to a cabinet according to claim 19, further comprising compressing the one or more spring clips to disengage the one or more spring clips from the outer surface of the frame to remove the frame from the cabinet.

21. The method of installing a frame to a cabinet according to claim 19, further comprising biasing ends of the one or more spring clips into the recesses in the outer surface of the frame.

* * * * *